E. W. KÜTTNER.
METHOD OF MANUFACTURING ELECTRIC COILS.
APPLICATION FILED JUNE 30, 1917.
1,381,567.
Patented June 14, 1921.
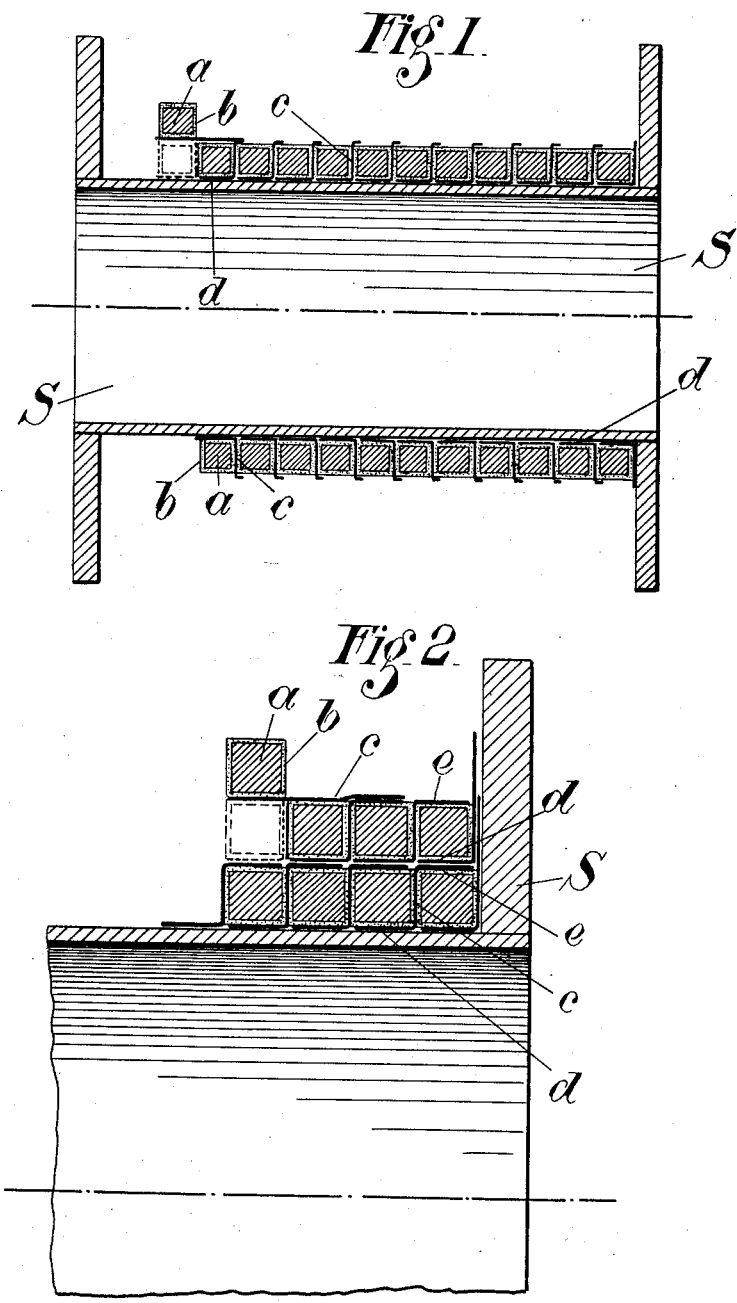
Inventor:
E. W. Küttner
by H. B. Willson & Co
Attorneys

UNITED STATES PATENT OFFICE.

ERNST WOLFGANG KÜTTNER, OF BERLIN, GERMANY.

METHOD OF MANUFACTURING ELECTRIC COILS.

1,381,567.     Specification of Letters Patent.     Patented June 14, 1921.

Application filed June 30, 1917. Serial No. 178,049.

*To all whom it may concern:*

Be it known that I, Dr. ERNST WOLFGANG KÜTTNER, citizen of Germany, subject of the King of Prussia and Emperor of Germany, residing at 26 Schlesischestrasse, Berlin, in the Kingdom of Prussia and Empire of Germany, have invented new and useful Improvements in Methods of Manufacturing Electric Coils, of which the following is a specification.

In making coils of metallic conductors, which are insulated by a coating of oxid of salt formed on the surface of the metal thereof, in particular of oxidized aluminium wires, it has been found that the coils will, after having been wound, not always show the resistance they were calculated for. Probably this is a result of the insulating coating having been damaged in winding, and it is therefore necessary to subsequently repair such insulation. When, for the purpose of such repairs it is attempted to increase such insulation, in particular by treating the wire with suitable oxidizing fluids after the coils have been wound, it is not always possible to secure a uniform insulation, for example with coils of great thickness, and with coils having numerous windings lying close together. In such cases the oxidizing medium will not always reach all parts of the wire uniformly, so that it becomes necessary to treat the coils for a long time or repeatedly. This is very inconvenient in manufacturing such coils, so much the more as each coil has to be continuously and very carefully controlled.

The present invention relates to an improved coil of this class and to a method of manufacturing the same, by which the aforementioned difficulties are obviated. According to the present invention absorbent layers are disposed between the windings of the coil, which layers preferably extend throughout the whole coil and facilitate a thorough saturation of the coil by the oxidizing fluid or the like. Under certain circumstances it will be sufficient, if one or several threads or strips of an absorbent material is wound with the wires in making the coil, so that such absorbent material lies beside the wires in the finished coil. The wire may, also, be spirally surrounded by such material or may be provided with a preferably thin envelop of fibers. This envelop need not be made with any regard to an insulating effect, as the latter will be secured in a fully satisfactory manner by the oxid coating. Therefore a material of inferior insulating value may be employed, such as, for example, a cotton spun on the wires, or a covering of paper or of a thin woven material. All that is required of such covering material is that the same will allow of the fluid employed for producing or improving the insulating coating on the surface of the metal having a ready access to all windings of the wire throughout the coil by force of its capillary action. The said intermediate layers may, therefore, also be made of absorbent mineral material, such as salts insoluble in water, oxids, asbestos and the like. As such layer, for example a covering of fibers will furthermore afford a protection for the insulating coating against the latter being damaged, it will, under certain circumstances, be sufficient to wind wire treated in such a manner, the insulation of which may be artificially increased, into a coil, and immediately have the resistance the latter has been calculated for. The coating of oxid will not suffer by the bending resulting from the winding operation; it is only necessary that an excessive friction of the wires against each other be avoided, this is secured by the layers being treated according to the present invention.

The thinner the absorbent layer employed is, the closer the windings of wire will lie next to each other, and the less the wire can move relatively to the neighboring wires, in case the protective layer should be destroyed, as such movements of the wires would tend to damage the insulating coating. When a thin layer of fibers is employed, for example a thin spun covering of the wires, it has been found to be preferable to saturate the layer with a suitable material for protecting it against being destroyed in service, for example against its becoming brittle in consequence of the heat of the current, vibrations, oscillations of the wires and the like. This is preferably done after the saturation with the oxidizing fluid, and is preferably performed by impregnating the covering with lac-like materials, which will penetrate the loose texture, heat, a vacuum or pressure being besides employed, if desirable. Also enamellike materials may be employed for such saturation, which materials will, after setting, securely bind the individual windings to each other by aid of the absorbent layers. As the insulation of the wires in the coil will be obtained in a satisfactory manner by the coating of oxid or salt on the surface of the metal, such impregnating fluids need not have any good insulating power, and therefore solutions of salts or organic liquids may be used therefor, which are known as being adapted to protect woven materials and the like against combustion and carbonization.
As the drop in tension between the individual layers in a coil is considerably higher than between two neighboring turns, and therefore the danger of the insulation being broken is greater between two layers in the coil than between two neighboring turns, suitable sheets of insulating material are generally disposed in the coils between the individual layers. This may be obtained, according to the present invention without impairing the absorbent power of the entire coil by the absorbent layers between the individual layers of the coil being made thicker than between the individual turns. The coil will then, as a whole, remain absorbent throughout, and the impregnation or saturation may then be effectively carried out notwithstanding the fact that the absorbent material between the individual layers is of a greater thickness. When, for example, the intermediate layer between the individual turns consists of organic fibrous material, the layers of material between the layers of wires in the coil may be made of an inorganic material, such as asbestos.
Furthermore the absorbent intermediate layers may be made thicker where the layers of wires meet. For this purpose the layers may, during their winding be covered with a suitable material, such as asbestos, or be coated with a liquid suspension of such materials. These intermediate layers may, under circumstances, not necessarily be absorbent, provided the absorbent power of the layers which are in immediate contact with the wires is not impaired by them, as in this case the thorough impregnation of the finished coil will not be prevented. The increasing of the insulation between the layers of wires may also be obtained by disposing between the layers of wires, for example at the ends of the coil, distance pieces, which may also be made of absorbent material of the thickness which the intermediate layer is to have, and thereupon filling up the thus formed intervening spaces with insulating material, while the coil is being wound or after the same has been wound. Owing to the absorbent character of the intermediate layers between the wires, this may be performed after the coil has been wound, in such a manner that the liquid insulating material is driven into the coils, if necessary by aid of pressure, vacuum or heat, so that it will accumulate in said intervening spaces and fill them.

The method forming part of the present invention may be performed in the following manner.

An aluminium wire covered with an insulating coat of oxid and thereafter with a thin spinning of an organic fibrous material is wound into a coil. After each layer of such coil has been completed, distance pieces are placed thereon, which will provide that a small space is left free between the individual layers. After the whole coil has been wound, the same is immersed in a hot solution of soda or some other suitable oxidizing medium; owing to the intermediate absorbent layers the whole coil is saturated with the oxidizing fluid, and the insulation is reliably secured in all parts thereof. Thereupon the coil is dried and immersed in a similar manner in a suitable, preferably insulating lac. The absorbent material extending throughout the entire coil will, during this latter immersion, by its capillarity, act in such a manner, that the insulating fluid is sucked through the entire coil and will fill up the empty spaces between the individual layers of the coil. If such insulating fluid is of a character that it will set and harden after drying or cooling, for example, a solution of rosin in a volatile solvent, or a cement, such as enamel, a coil will be obtained in which the wires and layers of wires are immovably held and bound together by the set insulating material.

I may render the enveloping layer incombustible by impregnating the absorbent material, when dry, with a fluid which is adapted to render the absorbent material incombustible, and this impregnating operation may be performed after the coil has been impregnated with oxidizing material, and before it is impregnated with the insulating material.

In the drawing the new method of manufacturing electric coils is represented in two examples of carrying out the invention. Figure 1 shows in section a part of an electric coil in the state of winding the first layer and Fig. 2 a part of another form of coil in which the second layer is partially wound.

$a$ is the aluminum wire of rectangular section, $b$ indicates the coat of oxid which exists originally on the surface of the aluminum metal and which is to be reinforced later by introducing an oxidizing liquid into the coil, $c$ is a strip of paper, which in the case of Fig. 1 is about double the width of the wire, and in Fig. 2 is three times as wide as the wire so that in the latter case in winding the coil, between two layers of the coil a double layer of paper $d$ and $e$ is formed and hereby the absorbent material is made thicker between the layers of the coils than between the individual turns.
The paper strip may have an even greater width for increasing this effect. This strip of absorbent material is wound into the coil together with the wire as shown in the drawing. Besides the paper strip wound in with the wire, also other intermediate insulating layers may be interposed between the single layers of the coil. After the coil is completely wound upon the spool S, it is immersed in a bath of oxidizing liquid and then dried, and then impregnated again with a fluid which will render the paper incombustible. Finally the coil will be impregnated with a liquid increasing the insulating qualities.

Having now described my invention what I claim and desire to secure by Letters Patent of the United States is:

1. The method of manufacturing electric coils consisting in providing a metallic conducting wire, providing and placing absorbent material between the individual turns of conducting wire, providing a liquid which is adapted to form an insulating chemical compound of the metal on the wire, introducing this liquid into the absorbent material and into the spaces between the wire and the absorbent material, providing a fluid which will render the absorbent material incombustible, and impregnating the absorbent material with such liquid incombustible material.

2. The method of manufacturing electric coils consisting in providing a metallic conducting wire, providing and placing absorbent material between the individual turns of conducting wire, providing a liquid which is adapted to form an insulating chemical compound of the metal on the wire, introducing this liquid into the absorbent material and into the spaces between the wire and the absorbent material, providing a liquid which contains solid matter in solution, such solid matter being non-conducting and incombustible when dry, and impregnating the absorbent material with such liquid.

3. The method of manufacturing electric coils consisting in providing a metallic conducting wire, providing and placing absorbent material between the individual turns of conducting wire, providing a liquid which is adapted to form an insulating chemical compound of the metal on the wire, causing or allowing this impregnated absorbent material to dry, then impregnating said absorbent material with a fluid which is adapted to render the absorbent material incombustible, and finally impregnating the absorbent material with a liquid, which, when dry, increases the insulating quality of the absorbent material.

In testimony whereof I have hereunto set my hand in presence of two subscribing witnesses.

Dr. ERNST WOLFGANG KÜTTNER.

Witnesses:
ANTON LEVY,
MARGARETHE SCHWARZ.